March 22, 1927.
D. R. THROOP
REVOLVING SCRAPER
Filed May 11, 1926
1,621,646
Fig. 1
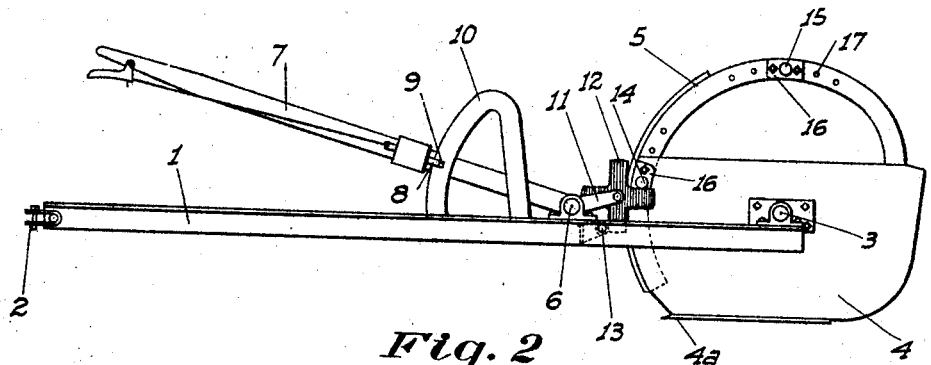
Fig. 2
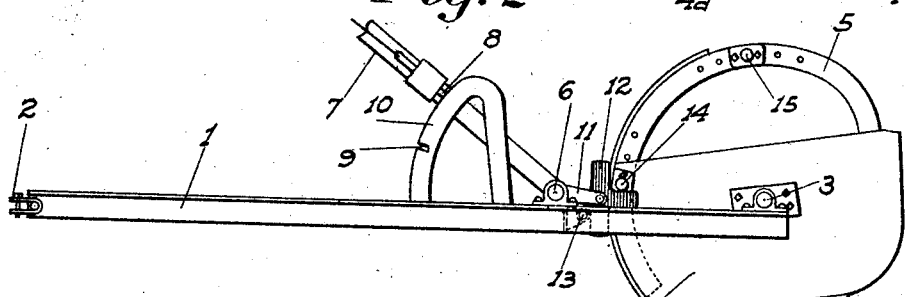
Fig. 3
Fig. 4
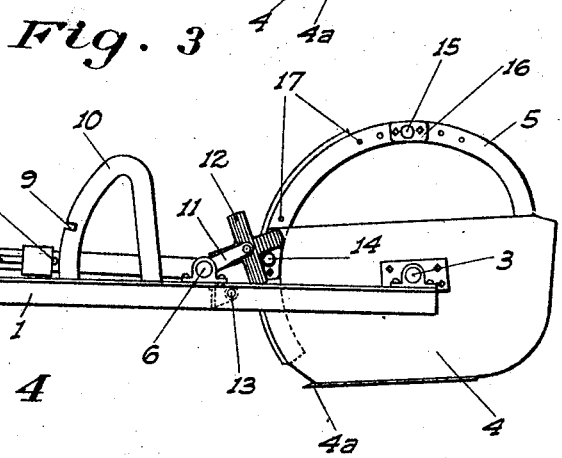
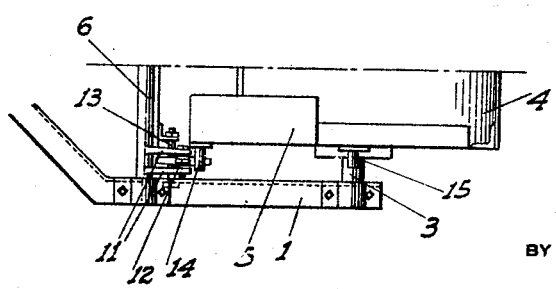
INVENTOR
D. R. Throop
BY
ATTORNEY March 22, 1927.
D. R. THROOP
1,621,646
REVOLVING SCRAPER
Filed May 11, 1926
Fig. 1
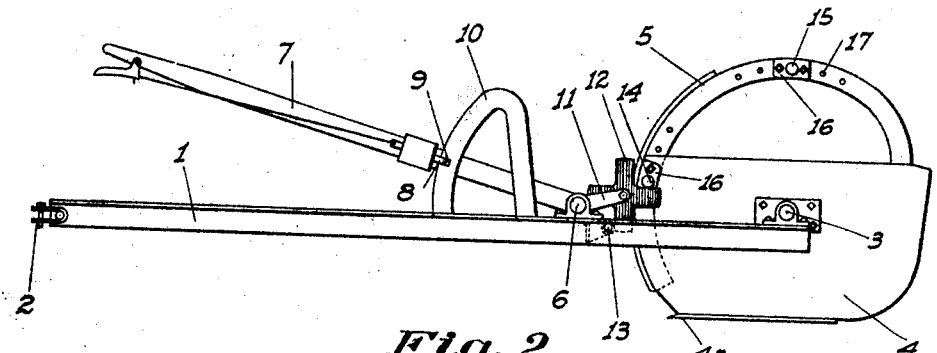
Fig. 2
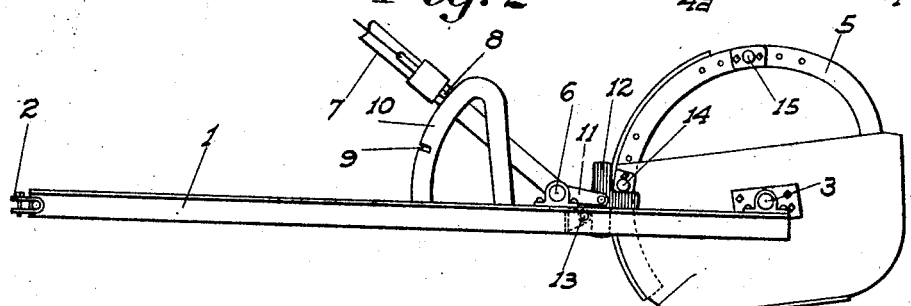
Fig. 3
Fig. 4
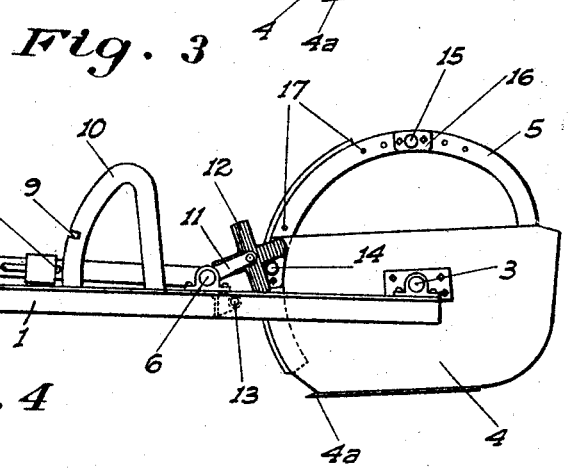
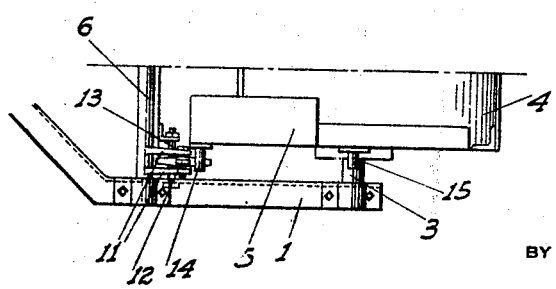
INVENTOR
*D.R.Throop*
BY
ATTORNEY Patented Mar. 22, 1927.

1,621,646

UNITED STATES PATENT OFFICE.

DAMON R. THROOP, OF STOCKTON, CALIFORNIA.

REVOLVING SCRAPER.

Application filed May 11, 1926. Serial No. 108,253.

This invention relates to improvements in scrapers of the rotary bowl type and particularly to a means for controlling the digging and dumping positions of the bowl.

The present invention represents modifications and developments of the form of control mechanism shown in my Patents No. 1,464,687 dated August 14th, 1923, and No. 1,585,947, dated may 25th, 1926. My principal object now is to provide an extremely simple mechanism to control the rotation of the bowl to digging, carrying and dumping positions by means of a single hand operated lever.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of the scraper with the bowl shown in its load carrying position.

Fig. 2 is a similar view showing the control lever raised and the bowl tilted to a scraping position.

Fig. 3 is a similar view with the control lever lowered to permit the bowl to dump.

Fig. 4 is a fragmentary top plan view of the scraper showing the bowl control structure on one side of the scraper.

Referring now more particularly to the characters of reference on the drawings, the numeral 1 denotes a suitable frame provided with a clevis 2 at its forward end for attaching and supporting the frame from a tractor or similar draft means. Pivotally mounted on trunnions 3 journaled on the frame adjacent the rear end thereof is a bowl 4, substantially of the well known Fresno type and resting on the ground. This bowl has runners 5 projecting upwardly therefrom.

Pivotally mounted on the frame ahead of the bowl and extending transversely of the frame is a shaft 6 projecting forwardly and radially from which is a lever 7. This lever has a hand operated pawl mechanism 8 of common character to engage a single notch 9 in a fixed quadrant 10. Fixed on and projecting rearwardly from the lever adjacent each side of the bowl is a pair of transversely spaced arms 11 between which is turnably mounted a star or spider member 12. This member preferably has four opposed and symmetrically arranged arms which are substantially of rectangular form, though the number of arms and the exact shape may be varied if desired.

Secured to the frame in the longitudinal plane between the shaft 6 and the pivotal connection of the star with the arms 11 is a stop member 13 of suitable form. This stop projects into the path of rotation of the star arms and engages the forward side of one of said arms when the lever-pawl is engaged with the quadrant notch, or when the lever is raised from such position.

Fixed on each runner 5 and projecting laterally therefrom in concentric relation with the trunnions are two pins 14 and 15, which also project into the path of rotation of the star arms. These pins are substantially ninety degrees apart, the forward lower pin 14 bearing against the rearwardly projecting star arm when another arm of the same is engaged by the stop 13. When the lever is in a quadrant engaging position and the pin and stop are thus engaged, the scraping edge 4ª of the bowl is in a substantially horizontal or non-scraping position, as shown in Fig. 1.

Since the bottom of the scraper rests on the ground, the forward movement of the frame tends to cause a forward rotation and upsetting of the bowl. Such rotation is normally prevented by the pin 14 bearing against the star and the latter being at the same time engaged with the stop 13. If the lever is raised the star will be lowered but will not be disengaged from the stop, as will be evident. The pin 14 follows up the lowering movement of the star, permitting a slight rotation of the bowl sufficient only to cause the scraping edge of the bowl to have a downward and forward slant, so that said edge may then scrape dirt into the bowl. The angle of this slant is of course determined by the extent the bowl is permitted to rotate, which extent is controlled by the distance the lever is moved upwardly from its normal or quadrant engaging position.

When it is desired to dump the scraper the lever is lowered from its normal position sufficient to cause the star to be raised to such an extent that the path of movement of the star arms will be clear of the stop 13, as shown in Fig. 3. The star therefore offers no resistance to the pressure of the pin 14 thereon, and the bowl is then free to rotate and upset, the star being rotated as the pin 14 bears down on the star arm engaged thereby, and moves past the same. As soon as this takes place the lever is returned to its normal position so that the star is again engaged with the stop, and with the rotation of the bowl the pin 15 will engage the star and the bowl will be held from further rotative movement. In this position the bowl will dump its load. When it is desired to restore the bowl to its normal position, the lever is again lowered to release the star and the pin 15 will pass by said star in the manner previously described in connection with the pin 14. With the continued forward movement of the scraper the bowl will be rotated until the pin 14 again reaches and engages the star, the lever having in the meantime been restored to its normal position.

The pins 14 and 15 are mounted on pads 16 to enable the pins to be secured to the runners 5. The latter have a number of circumferentially spaced holes 17 for the pad bolts to enable the position of the pads on the runners to be altered if desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A scraper comprising a frame, a bowl pivoted thereon and resting on the ground, a pin projecting laterally from the bowl in offset relation to the pivot thereof, a stop member projecting laterally from the frame beyond the bowl, and means releasable from the stop, normally engaging the stop and engaged by the pin.

2. A scraper comprising a frame, a bowl pivoted thereon and resting on the ground, a pin projecting laterally from the bowl in offset relation to the pivot thereof, a stop member projecting laterally from the frame beyond the bowl, unitary arms normally engaging the stop and pin, means for moving one arm clear of the stop, and means then permitting the pin to clear the other arm and the bowl to rotate.

3. A scraper comprising a frame, a bowl pivoted thereon and resting on the ground, a pin projecting laterally from the bowl in offset relation to the pivot thereof, a stop member projecting laterally from the frame beyond the bowl, arms fixed relative to each other radiating from a common center and arranged to engage the stop and pin respectively and simultaneously, and means on which said arms are pivoted arranged to be moved to enable the one arm to be moved clear of the stop.

4. A scraper comprising a frame, a bowl pivoted thereon and resting on the ground, a pin projecting laterally from the bowl in offset relation to the pivot thereof, a lever pivoted on the frame, a member having a pair of unitary radiating arms, one of said arms normally projecting into the path of the pin and being engaged thereby, a stop mounted on the frame and normally engaged by the other arm, and means between the lever and the arm member for enabling said one arm to be moved clear of the stop at will, the arm member being turnable whereby to then permit the pin to turn the arm engaged thereby and move past the same, and the bowl to upset.

5. A scraper comprising a frame, a bowl pivoted thereon and resting on the ground, a pin projecting laterally from the bowl in offset relation to the pivot thereof, a lever pivoted on the frame beyond the front end of the bowl, extensions projecting toward the bowl from the pivoted end of the lever, a member turnably mounted between said extensions and including arms radiating from the axis of said member, said arms being in the path of the pin and one arm being normally engaged by the pin, and a stop on the frame projecting into the path of the arms and normally engaging the other arm on the side thereof opposite to the bowl.

6. A scraper comprising a frame, a bowl pivoted thereon and resting on the ground, a pin projecting laterally from the bowl in offset relation to the pivot thereof, a substantially horizontal arm normally engaging the pin, vertically movable means on which the arm is turnably mounted, and means whereby when the arm is lowered from a predetermined position the bowl can only tilt forwardly to a limited extent but when the arm is raised from such predetermined position said arm is free to rotate to allow the pin to clear the same and the bowl to upset.

7. A scraper comprising a frame, a bowl pivoted thereon and resting on the ground, a pin projecting laterally from the bowl in offset relation to the pivot thereof, a substantially horizontal arm normally engaging the pin, vertically movable means on which the arm is turnably mounted, another and substantially vertical arm mounted in common with the first named arm, and a stop projecting laterally from the frame into the normal path of rotation of the arms and then engaging said other arm at such a point that the arms cannot rotate with the pressure of the pin on said first named arm.

In testimony whereof I affix my signature.

DAMON R. THROOP.